March 22, 1966     P. A. MERIGOLD     3,241,442
INVERTED TELEPHOTO TYPE OPTICAL OBJECTIVES
Filed Jan. 29, 1962
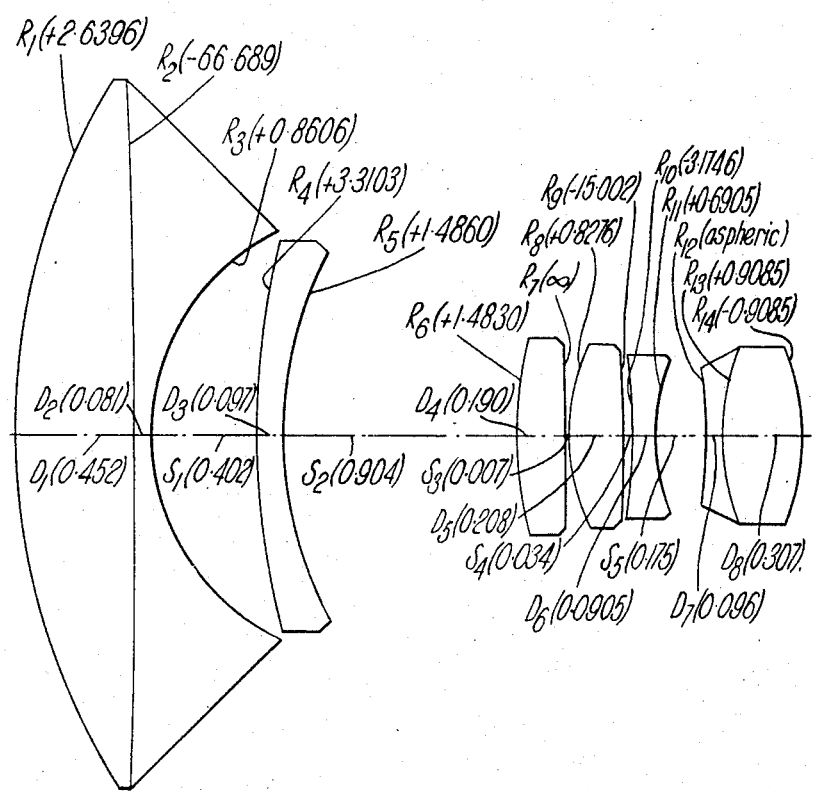
Inventor
P. A. Merigold
By
Attorneys United States Patent Office 3,241,442
Patented Mar. 22, 1966

3,241,442
INVERTED TELEPHOTO TYPE OPTICAL
OBJECTIVES
Peter Arnold Merigold, Leicester, England, assignor to
Rank Precision Industries Limited, Leicester, England,
a British company
Filed Jan. 29, 1962, Ser. No. 169,201
Claims priority, application Great Britain, Feb. 7, 1961,
4,561/61
6 Claims. (Cl. 88—57)

This invention relates to an optical objective corrected for spherical and chromatic aberrations, coma, astigmatism, field curvature and distortion, and of the type often known as the "inverted telephoto" type, in which by the use of a divergent front member widely separated from a convergent rear member, the ratio between the back focal distance and the equivalent focal length of the objective is made larger compared with the corresponding ratio in most other types of objective.

It should be made clear that the terms "front" and "rear" as used herein, relate to the sides of the objective respectively nearer to and further from the longer conjugate, in accordance with the usual convention.

An objective of the inverted telephoto type may be designed to give relatively large angular coverage at wide relative apertures, while its large back focal distance makes it convenient for use, not only at long equivalent focal lengths but also at shorter equivalent focal lengths, in circumstances in which it is desired to insert some device, such for example as the inclined mirror of a reflex camera, between the rear surface of the objective and the rear focal plane. However, most objectives designed in this manner have suffered from the drawback of having a much greater overall axial length than the more traditional types of photographic objective, but in some instances some reduction in overall axial length has been achieved by the use of a rear member having four components, of which the first, second and fourth (counting from the front) are convergent and the third is divergent.

The present applicant's copending United States patent application Ser. No. 48,602 filed on August 10, 1960 (now Patent No. 3,099,701) relates to an improved inverted telephoto objective having this kind of rear member, wherein a much reduced overall axial length is achieved, whilst still retaining adequate back focal distance relative to the equivalent focal length of the objective, and also having improved aberration correction. Thus, the invention of such copending application enables good correction to be obtained for all the primary aberrations, including coma and astigmatism, for a reasonably high relative aperture, for example of the order of $f/2.8$, and over a wide angle of view, say 64 degrees. This is achieved, according to such invention, by the use in combination of a number of features, of which some of the more important are that the objective comprises a divergent front member separated by a large air space lying between $0.8F$ and $1.4F$ (where F is the equivalent focal length of the complete objective) from a convergent rear member having four components, of which the first (counting from the front) is a simple convergent meniscus component with its surfaces convex to the front, the second and fourth are convergent doublet components, and the third is a simple biconcave divergent component, with the diaphragm between the third and fourth components, the numerical values of the equivalent focal lengths $f_F$ of the divergent front member and $f_R$ of the convergent rear member lying respectively between $2.5F$ and $5F$ and between $0.8F$ and $1.4F$. The specification of such copending application states that it is usually desirable to make the divergent front member of simple construction, for example in the form of a simple meniscus component, although a somewhat more complex construction of front member may be called for it is desired to increase the relative aperture or the angle of view. An increased relative aperture can, however, also be obtained by making one of the surfaces of the rear member aspheric, for example one of the surfaces of the doublet rear component, the asphericity being such as primarily to give correction at the increased aperture for spherical aberration, at least for one chosen wave-length, and to contribute towards correction of other aberrations, especially oblique aberrations. In a preferred arrangment of the earlier objective, for further assisting in the correction of coma and astigmatism, the rear surface of the doublet rear component of the rear member is concave to the front with radius of curvature lying between $0.4f_R$ and $0.8f_R$ and bearing a ratio to the radius of curvature of the internal contact in such rear component lying between 0.8 and 1.33, such internal contact being convex to the front. These last mentioned relationships still apply, at least at the vertex, if either the rear surface of the doublet rear component of the rear member, or the internal contact of such component, is made aspheric. In the preferred arrangement, however, it is the front surface of the doublet rear component of the rear member that is made aspheric.

It should be made clear that the term "internal contact," as used herein, is to be understod as including, not only a cemented internal contact surface, but also what is commonly known as a "broken contact," that is an assembly of two closely adjacent surfaces of slightly different curvatures within the component. In the case of a "broken contact," the radius of curvature thereof is to be understood to be the arithmetic mean between the radii of curvature of its two constituent surfaces, whilst its power is to be understood to be the harmonic mean between the powers of the two constituent surfaces.

The primary object of the present invention is to effect still further improvements in an objective of the above-mentioned inverted telephoto type having a convergent four component rear member, including some increase in back focal distance, an increase in the angular field coverage, say to beyond 80 degrees at a relative aperture of $f/2.0$, and also improved aberration correction, more especially in the higher order effects of astigmatism and distortion over the increased angular field. Further features of the invention also enable improved correction to be obtained for various higher order aberrations, including the zonal effects of all the primary aberrations with good freedom from vignetting and certain oblique aberrations.

The objective according to the present invention comprises a divergent front member separated from a four-component convergent rear member by a large axial air space lying between 0.75F and 1.25F (where F is the equivalent focal length of the complete objective) with the diaphragm located within the rear air space of the rear member, the numerical values of the equivalent focal lengths $f_F$ of the divergent front member and $f_R$ of the convergent rear member lying respectively between 1.5F and 2.5F and between 0.85F and 1.25F, the four components of the rear member in turn from the front consisting of a simple convergent component, a convergent component, a biconcave divergent component, and a convergent doublet component having a collective internal contact, whilst the divergent front member comprises a divergent doublet front component separated by an air space having divergent power lying numerically between 0.25 and 0.67 times the equivalent power of the objective from a divergent simple meniscus rear component having its surfaces convex to the front, the radius of curvature of the rear surface of such meniscus rear component being greater than the radius of curvature of the rear surface of the doublet front component.

The radius of curvatures of the rear surface of the simple divergent rear component of the front member lies between 1.25F and 1.75F and also between 0.8 and 1.2 times the radius of curvature of the front surface of the front component of the rear member, whilst the radius of curvature of the rear surface of the divergent third component of the rear member preferably lies between $0.5f_R$ and $0.75f_R$. Further assistance in the correction of higher order astimatism and distortion is thus afforded.

Low zonal effects of spherical aberration, coma and astigmatism and also good correction for oblique spherical aberration can be ensured by a suitable distribution of power throughout the objective. For this purpose, the equivalent focal length of the simple rear component of the front member lies between 0.85 and 1.25 times that of the doublet front component thereof, and the equivalent focal lengths of the four components of the rear member in turn from the front lie respectively between $1.5f_R$ and $2.5f_R$, between $0.75f_R$ and $1.25f_R$, between $0.6f_R$ and $1.0f_R$, and between $1.0f_R$ and $1.5f_R$ while the front air space in the rear member has convergent power lying between 0.5 and 1.5 times the equivalent power of the rear member, the middle air space in the rear member has divergent power lying numerically between 0.1 and 0.25 times the equivalent power of the rear member, and the rear air space in the rear member has divergent power lying numerically between 0.75 and 1.5 times the equivalent power of the rear member.

It should be explained that the power of an air space is defined as the algebraic sum of the powers of its bounding surfaces, the power of a surface being defined by the expression $(N^1-N)/R$, where $N^1$ and $N$ are the mean refractive indices of the media respectively behind and in front of the surface and R is the radius of curvature of the surface, the sign convention used being that a radius is regarded as positive if the surface is convex to the front and negative if the surface is concave to the front, whilst collective or convergent power is regarded as positive and dispersive or divergent power as negative.

Preferably, in order to correct oblique chromatic aberration, the Abbe V number of the material of the rear element of the doublet front component of the front member exceeds that of the front element of such component by between 10 and 20 and the average value of the mean refractive indices of the materials of such two elements lies between 1.65 and 1.75, whilst in the doublet rear component of the rear member the Abbe V number of the material of the rear element exceeds that of the front element by between 12 and 22 and the mean refractive index of the material of the rear element exceeds that of the front element by between 0.06 and 0.12.

The average value of the mean refractive indices of the materials of all the elements of the complete objective preferably exceeds 1.65, the Petzval sum of the objective lying between zero and 0.15 times the equivalent power of the objective, thus ensuring a good primary balance of astigmatism.

Preferably, the radius of curvature of the front surface of the biconcave divergent third component of the rear member lies between 4 and 6 times that of the rear surface of such component, whilst the front surface of the doublet rear component of the rear member is aspheric and has curvature at its vertex concave to the front and of radius greater than $5f_R$. This enables accurate correction of spherical aberration for one wave-length to be achieved.

For further assisting in the correction of higher order astigmatism and distortion, it is preferable for the radius of curvature of the front surface of the doublet front component of the front member to lie between 2.5 and 4.5 times the radius of curvature of the rear surface of such component, such surfaces both being convex to the front.

For assistance in the control of coma of the oblique rays, the radius of curvature of the internal contact in the rear component of the rear member preferably lies between 0.75 and 1.25 times that of the rear surface of such component, such surfaces being respectively convex and concave to the front.

The accompanying drawing illustrates in the conventional manner a preferred practical example of inverted telephoto objective according to the invention.

Numerical data for such example are given in the following table, in which $R_1$, $R_2$ . . . represent the radii of curvature of the individual surfaces of the objective counting from the front, the positive sign indicating that the surface is convex to the front and the negative sign that it is concave to the front; $D_1$, $D_2$ . . . represent the axial thicknesses of the individual elements of the objective; and $S_1$, $S_2$ . . . represent the axial air separations between the components of the objective. The table also gives the mean refractive index $n_d$ for the d-line of the spectrum and the Abbe V number of each of the materials used for the elements of the objective, and in addition the clear diameters of the various surfaces of the objective.

The insertion of equals (=) signs in the radius columns of the table, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

Equivalent focal length 1.000   Relative Aperture F/2.0

| Radius | Thickness or Air Separation | Refractive Index $n_d$ | Abbe V Number | Clear Diameter |
|---|---|---|---|---|
| $R_1 = +2.6396$ | | | | 2.745 |
| | $D_1 = .452$ | 1.74400 | 44.71 | |
| $R_2 = -66.689$ | | | | |
| | $D_2 = .081$ | 1.65100 | 58.60 | |
| $R_3 = +.8606$ | | | | 1.555 |
| | $S_1 = .402$ | | | |
| $R_4 = +3.3103$ | | | | 1.552 |
| | $D_3 = .097$ | 1.69100 | 54.80 | |
| $R_5 = +1.486$ | | | | 1.390 |
| | $S_2 = .904$ | | | |
| $R_6 = +1.483$ | | | | .766 |
| | $D_4 = .190$ | 1.7000 | 41.18 | |
| $R_7 = \infty$ | | | | .757 |
| | $S_3 = .007$ | | | |
| $R_8 = +.8276$ | | | | .747 |
| | $D_5 = .208$ | 1.71300 | 53.89 | |
| $R_9 = -15.002$ | | | | .693 |
| | $S_4 = .034$ | | | |
| $R_{10} = -3.1746$ | | | | .675 |
| | $D_6 = .0905$ | 1.70035 | 30.28 | |
| $R_{11} = +.6905$ | | | | .604 |
| | $S_5 = .175$ | | | |
| $R_{12} = -13.542$ (aspheric) | | | | .604 |
| | $D_7 = .096$ | 1.62576 | 35.74 | |
| $R_{13} = +.9085$ | | | | |
| | $D_8 = .307$ | 1.71300 | 53.89 | |
| $R_{14} = -.9085$ | | | | .665 |

Equation for aspheric surface $R_{12}$: $x = (-13.542 - \sqrt{(-13.542)^2 - y^2}) - .549y^4 - .18073y^6 + .4541y^8 + 1.1834y^{10}$ The radii, thicknesses, separations and diameters in the above table are given in terms of the equivalent focal length F of the complete objective.

The equation above given for the aspheric surface $R_{12}$ is in rectangular coordinates with the origin at the vertex of the surface, y being the coordinate at right angles to the optical axis, whilst x is the axial departure of the curve from the transaxial plane through the vertex and is taken as positive in the direction from such plane towards the rear. The radius of curvature at the vertex is 13.542F, the surface being concave towards the front, and there is a slight departure from the basic spherical surface of radius 13.542F, such departure being negligibly small near the optical axis and increasing slightly as the distance from the axis increases, the departure from the basic surface being towards the front in this example. The surface $R_{12}$ is chosen as the aspheric surface, since while its slight departure from the basic spherical surface is chosen primarily to give substantially complete spherical aberration correction for one chosen wave-length, this location is the most favourable for assisting in other aberration corrections.

The preferred example is well corrected over an angular field of 82 degrees at relative aperture F/2.0, not only for the primary aberrations, but also for the zonal effects of such aberrations, for higher order astigmatism and distortion and for certain oblique aberrations, and has good vignetting characteristics.

The back focal distance is 1.146F. The diaphragm is located 0.083F behind the surface $R_{11}$ within the rear air space $S_5$, with diameter 0.604F. The equivalent focal length $f_R$ of the complete rear member is 1.1404F, and the equivalent focal length $f_F$ of the complete front member is numerically equal to 1.948F and therefore also to 1.708$f_R$. The axial air separation $S_2$ between the two members is 0.904F.

The front member consists of a divergent doublet component having a collective internal contact surface $R_2$, followed by a divergent simple component, both components being of meniscus form with their air-exposed surfaces convex to the front. The average of the mean refractive indices of the materials of the two elements of the front doublet component is 1.69750 and the difference between the Abbe V numbers of these two materials is 13.89. The radius of curvature of the front surface $R_1$ of the front doublet component is 3.07 times that of the rear surface $R_3$ thereof. The air space $S_1$ between the front two components has divergent power numerically equal to 0.5477/F.

The rear member consists of four components, of which the first and second are simple and convergent, the third is a simple biconcave component whose front surfaces $R_{10}$ has radius of curvature approximately 4.6 times that of its rear surface $R_{11}$, the radius of such rear surface $R_{11}$ being approximately 0.6$f_R$, and the fourth is a convergent doublet component having collective internal contact surface $R_{13}$, whose radius of curvature is equal and opposite in sign to that of the rear surface $R_{14}$. The front surface $R_{12}$ of such rear doublet component is aspheric and concave to the front, as above described, and its radius of curvature at the vertex is approximately 12$f_R$.

The equivalent focal lengths of the convergent first, second and fourth components of the rear member are respectively 2.118F or 1.857$f_R$, 1.106F or 0.970$f_R$, and 1.205F or 1.057$f_R$. The equivalent focal length of the divergent third component is numerically equal to 0.802F or 0.703$f_R$. The front air space $S_3$ has convergent power equal to 0.86/F or 0.98/$f_R$. The middle air space $S_4$ has divergent power numerically equal to 0.17/F or 0.20/$f_R$. The rear air space has divergent power numerically equal to 1.06/F or 1.21/$f_R$. The difference between the mean refractive indices of the materials of the two elements of the doublet rear component is 0.087 and the difference between the Abbe V numbers of these two materials is 18.15.

The average of the mean refractive indices for all the elements of the objective is 1.692, and the Petzval sum of the objective is 0.0986/F.

It is to be understood that the foregoing example may be modified in various ways within the scope of the invention. Thus, for instance, although it will usually be preferable for the second component of the rear member to be simple, it may in some instances be desirable to make this component a doublet component, for example to assist in improved sphero-chromatic aberration correction when applying the invention to long equivalent focal lengths.

What I claim as my invention and desire to secure by Letters Patent is:

1. An optical objective of the inverted telephoto type corrected for spherical and chromatic aberrations, coma, astigmatism, field curvature and distortion, and comprising a divergent front member having equivalent focal length $f_F$ lying numerically between 1.5F and 2.5F (where F is the equivalent focal length of the complete objective) and a four-component convergent rear member having equivalent focal length $f_R$ lying between 0.85F and 1.25F, such two members being separated by a large axial air space lying between 0.75F and 1.25F, the diaphragm of the objective being located within the rear air space of the convergent rear member, the four components of the convergent rear member counting in turn from the front consisting of a simple convergent first component having equivalent focal length lying between 1.5$f_R$ and 2.5$f_R$, a convergent second component having equivalent focal length lying between 0.75$f_R$ and 1.25$f_R$, a biconcave divergent third component having equivalent focal length lying numerically between 0.6$f_R$ and 1.0$f_R$ with its rear surface having radius of curvature between 0.5$f_R$ and 0.75$f_R$, and a convergent doublet fourth component having a collective internal contact and having equivalent focal length lying between 1.0$f_R$ and 1.5$f_R$, the three air spaces in the convergent rear member counting in turn from the front respectively having convergent power lying between 0.5/$f_R$ and 1.5/$f_R$, divergent power lying numerically between 0.1/$f_R$ and 0.25/$f_R$ and divergent power lying numerically between 0.75/$f_R$ and 1.5/$f_R$, while the divergent front member comprises a divergent doublet front component separated by an air space having divergent power lying numerically between 0.25/$f_F$ and 0.67/$f_F$ from a divergent simple meniscus rear component having its surfaces convex to the front and having equivalent focal length between 0.85 and 1.25 times that of the divergent doublet front component, the radius of curvature of the rear surface of such simple divergent meniscus rear component being greater than that of the rear surface of such divergent doublet front component and lying between 1.25F and 1.75F and also between 0.8 and 1.2 times the radius of curvature of the front surface of the simple convergent first component of the rear member, while the radius of curvature of the front surface of the said divergent doublet front component lies between 2.5 and 4.5 times that of the rear surface of such component, the average value of the mean refractive indices of the materials of the two elements of such doublet component lying between 1.65 and 1.75.

2. An optical objective as claimed in claim 1, in which the Abbe V number of the material of the rear element of the doublet front component of the front member exceeds that of the front element of such component by between 10 and 20 while in the doublet rear component of the rear member the Abbe V number of the material of the rear element exceeds that of the front element by between 12 and 22 and the mean refractive index of the material of the rear element exceeds that of the front element by between 0.06 and 0.12, and in which the average value of the mean refractive indices of all the elements of the complete objective exceeds 1.65, and the Petzval sum of the objective lies between zero and 0.15 times the equivalent power of the objective.

3. An optical objective as claimed in claim 1, in which the radius of curvature of the front surface of the biconcave divergent third component of the rear member lies between 4 and 6 times that of the rear surface of such component, whilst the front surface of the doublet rear component of the rear member is aspheric and has curvature at its vertex concave to the front and of radius greater than $5f_R$.

4. An optical objective as claimed in claim 3, in which the radius of curvature of the internal contact in the rear component of the rear member lies between 0.75 and 1.25 times that of the rear surface thereof, such surfaces respectively being convex and concave to the front.

5. An optical objective as claimed in claim 1, in which the radius of curvature of the internal contact in the rear component of the rear member lies between 0.75 and 1.25 times that of the rear surface thereof, such surfaces respectively being convex and concave to the front.

6. An optical objective of the inverted telephoto type substantially in accordance with the following table of data and comprising a divergent front member consisting of a divergent doublet component ($R_1-R_3$) in front of a divergent simple component ($R_4-R_5$) and a convergent rear member consisting of two convergent simple components ($R_6-R_7$ and $R_8-R_9$) followed by a divergent simple component ($R_{10}-R_{11}$) and a convergent doublet component ($R_{12}-R_{14}$):

Equivalent focal length 1.000    Relative Aperture F/2.0

| Radius | Thickness or Air Separation | Refractive Index $n_d$ | Abbe V Number | Clear Diameter |
|---|---|---|---|---|
| $R_1 = +2.6396$ | | | | 2.745 |
| | $D_1 = .452$ | 1.74400 | 44.71 | |
| $R_2 = -66.689$ | | | | |
| | $D_2 = .081$ | 1.65100 | 58.60 | |
| $R_3 = +.8606$ | | | | 1.555 |
| | $S_1 = .402$ | | | 1.552 |
| $R_4 = +3.3103$ | | | | |
| | $D_3 = .097$ | 1.69100 | 54.80 | |
| $R_5 = +1.486$ | | | | 1.390 |
| | $S_2 = .904$ | | | .766 |
| $R_6 = +1.483$ | | | | |
| | $D_4 = .190$ | 1.7000 | 41.18 | |
| $R_7 = \infty$ | | | | .757 |
| | $S_3 = .007$ | | | .747 |
| $R_8 = +.8276$ | | | | |
| | $D_5 = .208$ | 1.71300 | 53.89 | |
| $R_9 = -15.002$ | | | | .693 |
| | $S_4 = .034$ | | | .675 |
| $R_{10} = -3.1746$ | | | | |
| | $D_6 = .0905$ | 1.70035 | 30.28 | |
| $R_{11} = +.6905$ | | | | .604 |
| | $S_5 = .175$ | | | .604 |
| $R_{12} = -13.542$ (aspheric) | | | | |
| | $D_7 = .096$ | 1.62576 | 35.74 | |
| $R_{13} = +.9085$ | | | | |
| | $D_8 = .307$ | 1.71300 | 53.89 | |
| $R_{14} = -.9085$ | | | | .665 |

Equation for aspheric surface $R_{12}$: $x = (-13.542 - \sqrt{(-13.542)^2 - y^2}) - .549y^4 - .18073y^6 + .4541y^8 + 1.1834y^{10}$ wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thickness of the individual elements, and $S_1, S_2 \ldots$ represent the axial air separations between the individual components, the numerical suffixes in each case being in order counting from the front.

References Cited by the Examiner

UNITED STATES PATENTS 2,927,506  3/1960  Determann _____ 88—57
3,033,082  5/1962  Merigold _____ 88—57
3,064,533  11/1962  Hudson _____ 88—57 X JEWELL H. PEDERSEN, *Primary Examiner.*